Sept. 26, 1939. J. C. McCUNE 2,174,407
BRAKE MECHANISM
Filed Nov. 9, 1937 2 Sheets-Sheet 1

INVENTOR
JOSEPH C. McCUNE
BY Wm. M. Cady
ATTORNEY

Sept. 26, 1939. J. C. McCUNE 2,174,407
BRAKE MECHANISM
Filed Nov. 9, 1937 2 Sheets-Sheet 2

INVENTOR
JOSEPH C. McCUNE
BY Wm. W. Cady
ATTORNEY

Patented Sept. 26, 1939

2,174,407

UNITED STATES PATENT OFFICE 2,174,407

BRAKE MECHANISM

Joseph C. McCune, Edgewood, Pa., assignor to The Westinghouse Air Brake Company, Wilmerding, Pa., a corporation of Pennsylvania Application November 9, 1937, Serial No. 173,622

6 Claims. (Cl. 188—59)

This invention relates to friction disk brake mechanism and more particularly to the type of disk brake mechanism disclosed in my prior pending application, Serial No. 139,969, filed April 30, 1937, or in the prior pending joint application of Clyde C. Farmer and myself, Serial No. 170,240, filed October 21, 1937.

The disk brake units disclosed in the above referred to applications are each shown embodied in a railway vehicle truck and in each unit the tendency of the non-rotatable parts to rotate with the rotatable brake elements when an application of the brakes is being effected is counteracted by the truck frame, there being a direct connection between the stationary parts and the truck frame. While this is not deemed objectionable yet it may be desirable in some cases to prevent the truck frame from being subjected to the torque forces of the brake units carried by the axles of the truck, both when the brakes are applied and when the brakes are released, and an object of the present invention is to provide a friction disk type of brake mechanism for two adjacent axles of a railway truck having means whereby the torque forces set up by each brake unit of the mechanism will be taken by the units themselves and by the axles wholly independently of the truck frame.

This object is attained by connecting the brake unit associated with one axle with the brake unit of the adjacent axle in such a manner that each unit will counteract the torque forces set up by the other.

Other objects and advantages will be apparent from the following more detailed description of the invention.

Figure 1:
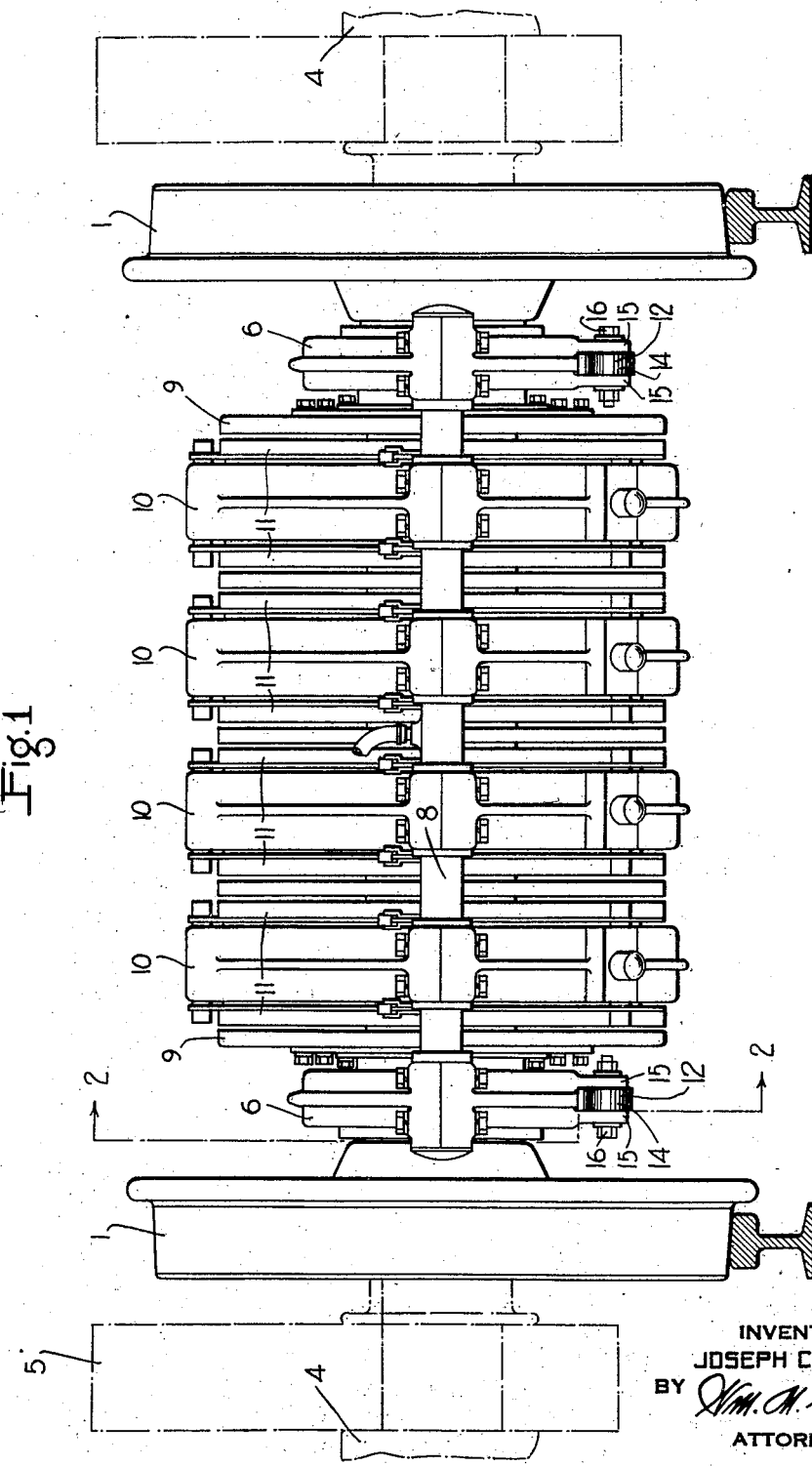
Figure 2:
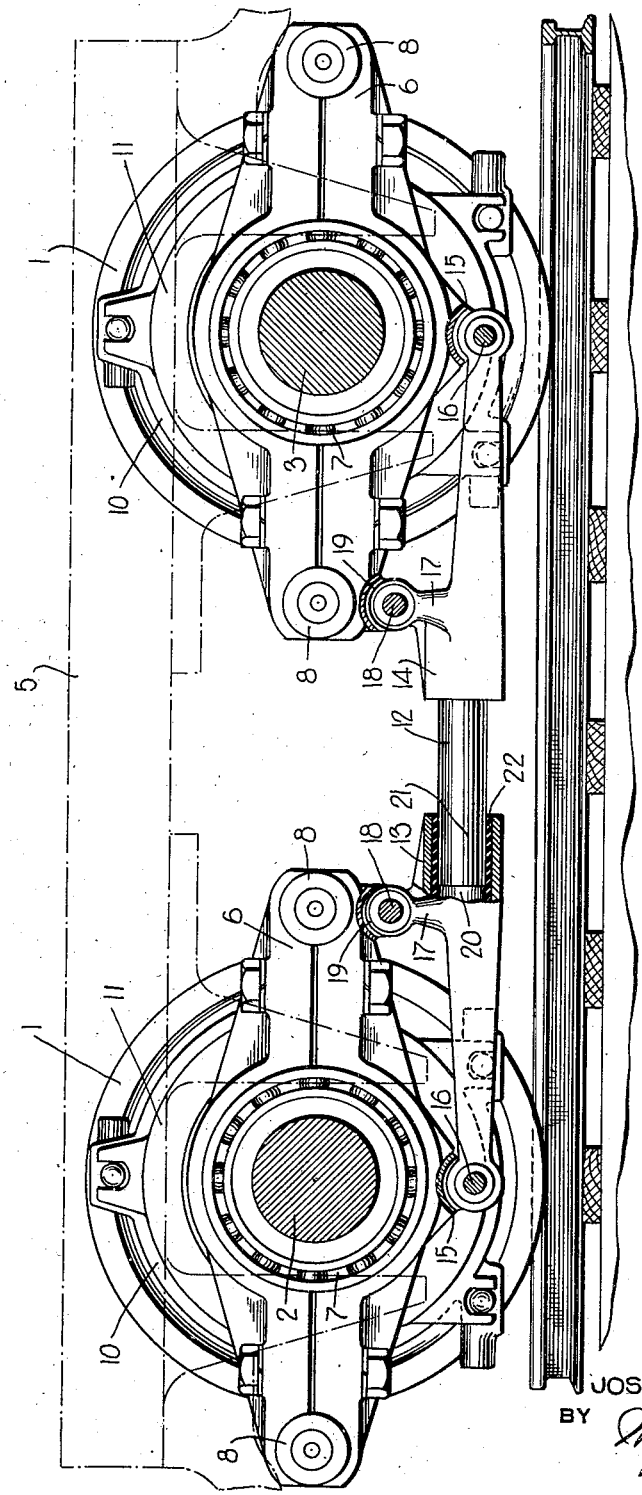

In the accompanying drawings Fig. 1 is an end elevational view of the brake mechanism, portions of the truck frame being shown in dot and dash lines; and Fig. 2 is a longitudinal sectional view of the same taken on the line 2—2 of Fig. 1.

As shown, the car truck may comprise the usual wheels 1 which are secured in any desired manner to axles 2 and 3 which may be suitably journaled in journal boxes 4 mounted in the usual manner in a truck frame 5 which may be of any desired type. Mounted on each axle is a friction disk brake unit which, with the exception of the omission of the connection between the units and the truck frame for rendering certain parts of the units non-rotatable with the axle, and the exception of the hereinafter fully described novel construction provided for maintaining these parts against rotation and for preventing torque forces of the unit from being applied to the truck frame, may be identical with the brake unit disclosed in my aforementioned pending application or if desired may, with the above exceptions, be identical with the brake unit disclosed in the aforementioned pending joint application.

Briefly described each brake unit may comprise a supporting structure having spaced end members 6 which are arranged one on each side of the longitudinal center line of the truck and which are each supported by the axle through the medium of a bearing 7 preferably of the antifriction type, the bearing shown in the drawings being of the ball type. These members support and hold securely in place against end-wise movement two transversely extending hollow bars 8 which are arranged one on each side of the axle, the axes of the bars being parallel with the axis of the axle and preferably in the same horizontal plane.

Between the end members 6 and rotatable by the axle are spaced brake elements 9, and between each two of these elements is an annular brake cylinder device 10 which encircles the axle and is carried by the bars 8 of the supporting structure, each of said brake cylinder devices being operative by fluid under pressure to move non-rotatable brake elements 11 into braking engagement with the rotatable brake elements 9, which elements are either carried by the brake cylinder devices and consequently by the supporting structure as shown in my aforementioned pending application or are carried directly by the supporting structure as shown in the aforementioned pending joint application.

In the brake apparatus or unit shown in each of the two aforementioned pending applications, the brake cylinder devices are provided with lugs which engage a fixed part of the truck frame to maintain the supporting structures, brake cylinders and non-rotatable brake elements against rotation with or by the axle.

According to the present invention the connection between the truck frame and the non-rotatable parts of the brake unit is eliminated and means is provided whereby two adjacent brake units are caused to cooperate with each other in such a manner that the parts of both units which are not intended to rotate will be held stationary against rotation with the axle and whereby each unit will neutralize the torque forces set up by the other.

This means may comprise one or more rotation preventing members 12 which extend longitudinally of the truck between the axles, and which is connected to the supporting structures in such a manner as to maintain both supporting structures against rotation. In the drawings, two members 12 are shown, each of which extends between and is connected to both of the end members 6 at each side of the truck.

In the present embodiment of the invention the members 12 are each shown as comprising a part 13 and a part 14. The outer end of the part 13 is secured to spaced parallel downwardly extending lugs 15 of the end member of the supporting structure carried by the axle 2 by means of a transversely extending pin or bolt 16 which is preferably located directly below the axle, and adjacent its inner end this part 13 is provided with an upwardly extending lug 17 which is secured by means of a pin 18 to spaced parallel downwardly extending lugs 19 of the end member.

The inner and outer end portions of each part 14 are secured to the end member of the supporting structure carried by the axle 2 in the same manner as the part 13 is secured to its adjacent supporting structure.

The inner end of the part 13 is provided with a recess 20 for the reception of the inner end 21 of the part 14, there being a tubular rubber sleeve 22 interposed between the inner wall of the recess and the outer surface of the end 21 for preventing chatter between the parts 13 and 14.

From the foregoing description it will be apparent that the supporting structures and parts carried thereby will, due to the cooperation of the supporting structures with each other through the medium of the members 12 be maintained against rotation with the axles. It will also be apparent that due to this cooperation each brake unit will neutralize the torque forces set up by the other.

It should here be mentioned that the wheels and axle assemblies of railway vehicle trucks may, due to the usual operating clearances and wear between associated parts, change their positions relative to each other in directions longitudinally of the truck. By reason of the telescopic connection between the parts 13 and 14 of each member 12 these parts are adapted to freely adjust themselves to compensate for such movement of the wheel and axle assemblies, thus preventing undue strain on the members 12.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a brake mechanism, in combination, two spaced rotatable members to be braked, two brake units arranged one for each member, each unit comprising a rotatable brake element encircling one of said members and adapted to be driven by the member, a brake element movable longitudinally of the member into braking engagement with the rotatable brake element, and means extending between and connecting both brake units together to prevent rotation of the longitudinally movable elements with the members and rotatable brake elements, said means being so constructed and arranged as to provide a lost motion connection to accommodate movement of the members either toward or away from each other.

2. In a brake mechanism, in combination, two parallel rotatable members to be braked, a brake unit for each member and carried by the member comprising rotatable friction braking elements and non-rotatable parts including friction braking elements movable into braking engagement with the rotatable brake elements, and means connecting the non-rotatable elements of both brake units together against rotation by the members, said means comprising two members extending at right angles to the axes of said rotatable members slidably connected together at their adjacent ends to permit movement of the members relative to each other upon movement of the rotatable members in directions toward or away from each other.

3. In a brake mechanism for a railway car truck, in combination, a truck frame, a plurality of wheel and axle assemblies supporting said truck frame, a brake unit carried by each axle independently of said truck frame, each brake unit comprising a brake element rotatable by the axle, and non-rotatable means operative to frictionally engage said rotatable element to effect an application of the brakes, and means connecting together the non-rotatable means of both units to render each unit effective to neutralize the torque forces set up by the other, said means comprising a plurality of members adjustably connected together between said wheel and axle assemblies to compensate for movement of the wheels and axle assemblies relative to each other in directions longitudinally of the truck frame.

4. In a brake mechanism for a railway car truck, in combination, a truck frame, a plurality of wheel and axle assemblies supporting said truck frame, a brake unit carried by each axle independently of said truck frame, each brake unit comprising a brake element rotatable by the axle, and non-rotatable means operative to frictionally engage said rotatable element to effect an application of the brakes, and means separate from the truck frame for preventing the torque forces of said units being applied to the truck frame, said means comprising a plurality of longitudinally movable members telescopically connected to accommodate relative movement between the wheel and axle assemblies in directions longitudinally of the truck frame.

5. The combination with two adjacent rotatable axles of a railway vehicle, a brake unit for each axle, each unit comprising a brake element rotatable with the corresponding axle and a non-rotating element movable into frictional engagement with the rotatable element, and means cooperatively supported by said axles and operatively connected with the non-rotating elements to oppose rotation thereof, said means being so constructed and arranged as to be variable in length under the influence of relative movement between the axles in directions longitudinally of the vehicle.

6. In a brake mechanism for a railway car truck, in combination, a truck frame, a plurality of wheel and axle assemblies supporting said truck frame, a brake unit associated with each wheel and axle assembly, each brake unit comprising a brake element rotatable with the assembly and non-rotatable means for frictional engagement with the rotatable brake element to effect braking of the respective assembly, and means extending between and connecting the non-rotatable means together to prevent rotation of the non-rotatable means, said means being so constructed and arranged as to yield to relative movement between said assemblies in directions longitudinally of the truck frame.

JOSEPH C. McCUNE.